US010235615B2

(12) United States Patent
Buller

(10) Patent No.: US 10,235,615 B2
(45) Date of Patent: Mar. 19, 2019

(54) ACQUIRING, STORING, AND TRANSMITTING RFID CREDENTIAL DATA

(71) Applicant: Elliot Benjamin Buller, San Diego, CA (US)

(72) Inventor: Elliot Benjamin Buller, San Diego, CA (US)

(73) Assignee: Tiny Labs, Inc., San Diego, CA (US)

( * ) Notice: Subject to any disclaimer, the term of this patent is extended or adjusted under 35 U.S.C. 154(b) by 0 days.

(21) Appl. No.: 15/721,936

(22) Filed: Oct. 1, 2017

(65) Prior Publication Data

US 2018/0096238 A1 Apr. 5, 2018

Related U.S. Application Data

(60) Provisional application No. 62/403,166, filed on Oct. 2, 2016.

(51) Int. Cl.
| | |
|---|---|
| *H04B 5/00* | (2006.01) |
| *G06K 19/06* | (2006.01) |
| *G06K 19/07* | (2006.01) |
| *G06Q 20/04* | (2012.01) |
| *G06Q 20/32* | (2012.01) |
| *H04M 1/725* | (2006.01) |

(52) U.S. Cl.
CPC ... *G06K 19/0723* (2013.01); *G06K 19/06206* (2013.01); *G06K 19/0719* (2013.01); *G06Q 20/045* (2013.01); *H04B 5/0062* (2013.01); *G06Q 20/3278* (2013.01); *H04M 1/7253* (2013.01); *H04M 1/72575* (2013.01)

(58) Field of Classification Search
CPC ......... G06K 19/0723; G06K 19/06206; G06K 7/0008; G06K 7/10366
See application file for complete search history.

(56) References Cited

U.S. PATENT DOCUMENTS

| | | | | |
|---|---|---|---|---|
| 5,721,689 A | * | 2/1998 | Hart | G01R 19/2513 |
| | | | | 341/123 |
| 8,410,908 B2 | | 4/2013 | Pendlebury | |
| 2002/0131530 A1 | * | 9/2002 | Zhang | H03K 5/1252 |
| | | | | 375/340 |
| 2007/0274242 A1 | | 11/2007 | Lamacraft | |

(Continued)

*Primary Examiner* — Omeed Alizada
(74) *Attorney, Agent, or Firm* — TJSL Patent Clinic; Bridget Watson; Daryl Fernandez

(57) ABSTRACT

An electronic device and corresponding method are used for acquiring, storing, and transmitting radio frequency identification (RFID) credential data previously stored in another device. The electronic device includes a mechanical housing, electronic circuitry mounted within the mechanical housing, a power source coupled to the electronic circuitry to provide electrical power to the electronic circuitry, and an interface mechanism coupled to the electronic circuitry in a manner to allow a human user to effect operation of the electronic circuitry. The electronic circuitry is configured to (a) receive an initial response RF signal emitted by the other device in response to an initial interrogation RF signal, where the initial response RF signal carries the RFID credential data, (b) acquire the RFID credential data from the initial response RF signal, (c) store the RFID credential data, and (d) transmit to an interrogator device an outgoing RF signal that carries the RFID credential data.

19 Claims, 6 Drawing Sheets

(56) References Cited

U.S. PATENT DOCUMENTS

| | | | |
|---|---|---|---|
| 2008/0252414 A1* | 10/2008 | Crigger | G07C 9/00158 |
| | | | 340/5.52 |
| 2009/0243810 A1* | 10/2009 | Pendlebury | G06K 19/06206 |
| | | | 340/10.4 |
| 2013/0207777 A1 | 8/2013 | Zatloukal et al. | |
| 2013/0234832 A1* | 9/2013 | Manzi | G06K 7/10237 |
| | | | 340/10.2 |
| 2016/0366010 A1* | 12/2016 | Hamber | H04L 41/0866 |
| 2017/0002595 A1* | 1/2017 | Keller, Jr. | E05F 15/40 |

\* cited by examiner

500

ACQUIRING, STORING, AND TRANSMITTING RFID CREDENTIAL DATA

CROSS-REFERENCE TO RELATED APPLICATION

This application claims the benefit of priority to U.S. Provisional Patent Application No. 62/403,166, filed on Oct. 2, 2016, entitled "RFID Key-copying Device," the entire disclosure of which is incorporated by reference herein.

FIELD OF THE DISCLOSURE

This application relates to RFID technology and, more specifically, to storage and use of RFID credential data.

BACKGROUND

Radio frequency identification (RFID) has been around since World War II. In the last 30 years, RFID technology has been widely adopted for many applications, including controlling access to secure buildings, systems, or information. Although RFID technology has been long researched and is a mature, robust technology capable of providing very strong forms of security, the majority (approximately 70-80%) of systems used for building access control do not use any form of encryption nor any bidirectional challenge/response mechanism. This is likely due to market price sensitivity and the relatively low value of the assets the systems protect.

As a result, the majority of RFID systems operate, in essence, as keepers of electronic serial numbers. When an RFID tag (embedded, for example, in an employee-identification badge, a key fob, or a key-chain "dongle") is powered by a nearby RFID interrogator, or reader, the tag transmits its unique credentials, which, if found in a database of recognized credentials, grants the holder of the tag access to the secured facility. These low cost and convenient RFID tags have resulted in widespread adoption, with millions of systems in use around the world today.

The end users of such RFID systems, who are typically unfamiliar with the underlying technology, tend to consider an RFID tag as an "electronic key" having similar security features as a traditional mechanical key. With mechanical keys, many people make copies for a variety of reasons, e.g., to use for backup in the event the original keys are lost, or to grant shared access to secure locations (e.g., a home or an office building) with other individuals. The holders of electronic keys may well want copies of their RFID tags for the same reason, but to date there is no device that will allow consumers to make such copies.

Furthermore, because of the widespread adoption of RFID systems, many people must carry multiple RFID tags for access to multiple secure sites. For example, one individual might have separate RFID tags to gain access to a residence, to a fitness facility, and to an office building. People often grow frustrated at having to carry numerous RFID tags.

SUMMARY

Described here are a method and an electronic device for use in acquiring, storing, and transmitting radio frequency identification (RFID) credential data previously stored in another device. The electronic device includes a mechanical housing, electronic circuitry mounted within the mechanical housing, a power source coupled to the electronic circuitry to provide electrical power to the electronic circuitry, and an interface mechanism coupled to the electronic circuitry in a manner to allow a human user to effect operation of the electronic circuitry. The electronic circuitry is configured to (a) receive an initial response RF signal emitted by the other device in response to an initial interrogation RF signal, where the initial response RF signal carries the RFID credential data, (b) acquire the RFID credential data from the initial response RF signal, (c) store the RFID credential data, and (d) transmit to an interrogator device an outgoing RF signal that carries the RFID credential data.

In various embodiments, the electronic circuitry is configured both to generate and to transmit the initial interrogation RF signal; to store the RFID credential data in a storage location selected by the user through manipulation of the interface mechanism; or to store the RFID credential data from multiple other devices, with the RFID credential data from each device being stored in or subsequently transmitted from a location selected by the user through manipulation of the interface mechanism.

In certain embodiments, the interface mechanism includes one or more interface components configured to allow selection between an RFID data storage mode and an RFID data emulation mode of operation; to allow selection among multiple RFID storage locations in the electronic device; to cause the electronic circuitry to create and transmit the initial interrogation RF signal; or to cause the electronic circuitry to create and transmit the outgoing RF signal.

For some embodiments, when acquiring the RFID credential data from the initial response RF signal, the electronic circuitry acquires the data from signals having multiple types of RF modulation, such as ASK, FSK, and PSK modulation. When acquiring the RFID credential data from the initial response RF signal, the electronic circuitry might also adjust frequency of the initial response RF signal to a nearest integer factor of the RF signal's main carrier frequency, or it may sample the initial response RF signal and create a map of discrete data points representing relative timing between comparator edges to determine which data points represent relevant data. The electronic circuitry in some embodiments is also able to distinguish self-similar data structures.

BRIEF DESCRIPTION OF THE DRAWINGS

The novel features of this invention, as well as the invention itself, both as to its structure and its operation, will be best understood from the accompanying drawings, taken in conjunction with the accompanying description, in which.

DETAILED DESCRIPTION

Figure 1:
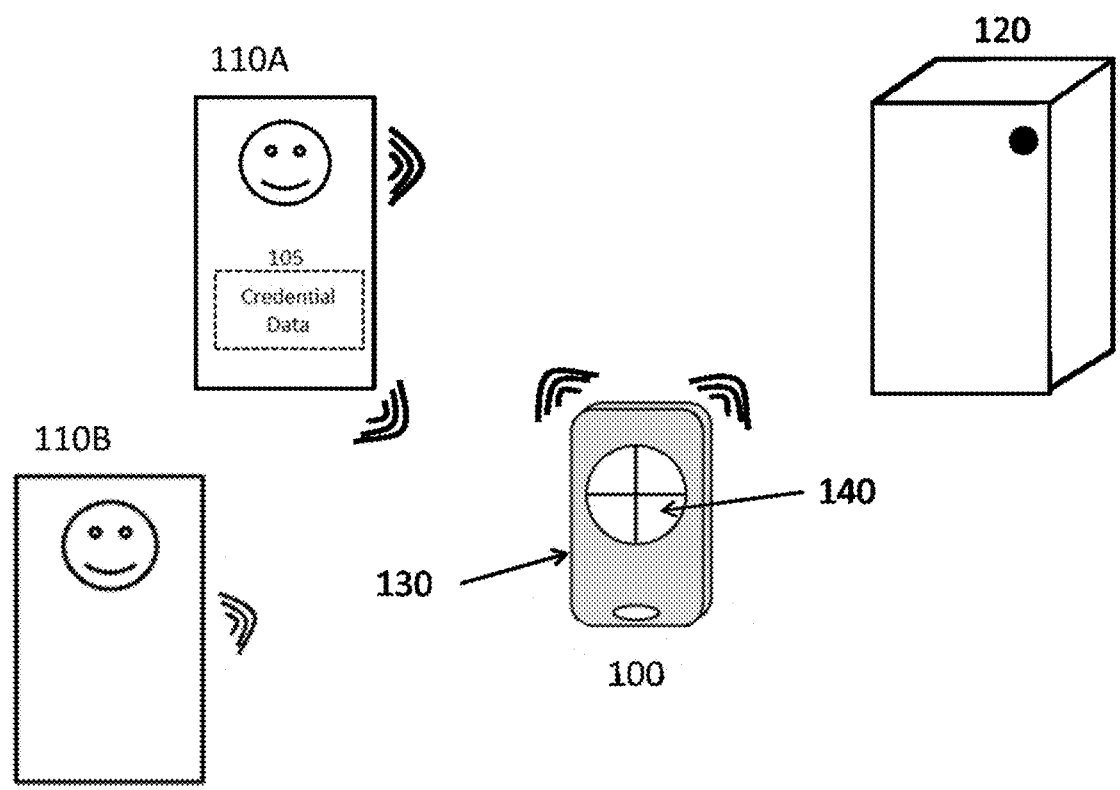
FIG. 1 illustrates an embodiment of an RFID key-copying device.

FIG. 1 shows an RFID key-copying device 100 that allows an end-user to make copies of RFID credential data 105 embedded in one or more RFID tags 110A-B associated with a particular end-user. The key-copying device 100 acts as a "proxy" RFID tag that, when placed in proximity to an external tag reader 120, mimics the operation of a tag whose credentials it stores. In some embodiments, the key-copying device 100 captures the RFID credentials by "sniffing" the communication between the RFID tag 110A-B and the external RFID tag reader 120 as the tag reader interrogates the RFID tag 110A-B. In other embodiments, the key-copying device 100 captures the RFID credential data 105 by interrogating the RFID tag 110A-B itself. In either case, the device shown here has at least two modes of operation: a tag-storage mode, during which the device captures and stores the RFID credential data 105 embedded in the RFID tag 110A-B, and a tag-emulation mode, during which it interacts with the external RFID tag reader 120 to provide the copied credential data 105.

In a typical embodiment, the key-copying device 100 includes a physical housing 130 that fits in the end-user's hand and houses electronic circuitry (not shown in FIG. 1) that carries out the functional operation of the key-copying device 100, as described below. The electronic circuitry can be implemented in hardware or software and in many embodiments include a combination of the two. The physical housing 130 also includes user-interface elements 140 (such as buttons, LED indicators, digital and/or touchscreen displays, etc.) that allow the end-user to place the device in both tag-storage mode and tag-emulation mode and to control operation of the device while in each mode.

Figure 2:
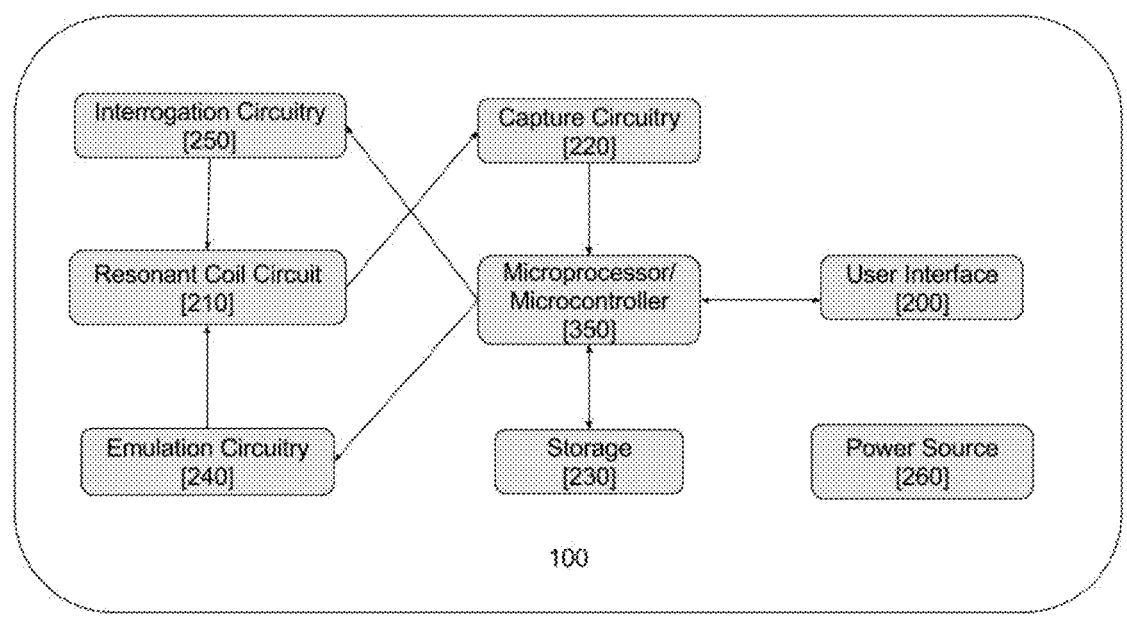
FIG. 2 illustrates some of the functional components of an exemplary embodiment of an RFID key-copying device.

FIG. 2 shows the functional components of the key-copying device 100. User-interface circuitry 200 responds to the end-user's manipulation of the user-interface elements 140 of FIG. 1 to enable direct operation of the key-copying device by the user. A power source 260 provides power to the electronic circuitry. A resonant coil circuit 210 allows the device to communicate with RFID tags. As will be described in more detail below, when the end-user places the device in tag-storage mode, the resonant coil circuit 210 receives from an external RFID tag an RF signal that carries RFID credential data embedded in the RFID tag. Capture circuitry 220 isolates the RFID credential data carried by the signal and delivers the credential data to storage circuitry 230 by way of microprocessor or microcontroller circuitry 350 for storage and later use during tag-emulation mode. When the end-user places the device in tag-emulation mode, emulation circuitry 240 retrieves the RFID credential data from the storage circuitry 230 by way of the microprocessor/microcontroller circuitry 350 for modulation onto a carrier signal that is transmitted by an external tag reader at a controlled access point. In embodiments where the key-copying device 100 itself interrogates the RFID tag during tag-storage mode, interrogation circuitry 250 creates an interrogation signal, delivered by the resonant coil circuit 210 to the RFID tag, which causes the RFID tag to transmit the RF signal that carries the RFID credential data.

Figure 3:
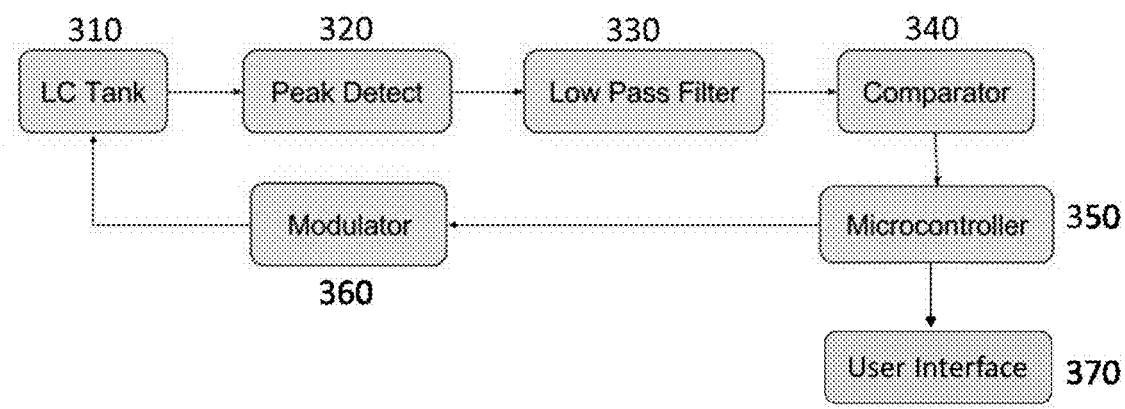
FIG. 3 illustrates some of the functional components of the RFID capture and emulation circuitry of an exemplary embodiment of an RFID key-copying device.

FIG. 3 shows the functional components of one embodiment of the capture circuitry 220 and emulation circuitry 240 of FIG. 2, including LC tank circuitry 310, peak detector circuitry 320, filtering circuitry 330, comparator circuitry 340, microprocessor/microcontroller circuitry 350, modulator circuitry 360, and user interface circuitry 370. The LC tank circuitry 310 transmits and receives signals to/from an RFID tag or external tag reader. The peak detector circuitry 320 detects the peaks of the incoming signal from the RFID tag. The microcontroller circuitry 350 communicates with the user-interface circuitry 370 and controls the operation of the comparator circuitry 340 and the modulator circuitry 360. The modulator circuitry 360 is used to transmit RFID tag credential data to the external tag reader when the device is in tag-emulation mode.

The user-interface circuitry 370 responds to the user's manipulation of the user-interface elements 140 of FIG. 1 to allow the user to place the device in tag-storage and tag-emulation modes. For a device capable of storing credential data from more than one tag, the user-interface circuitry 370 also responds to the user's manipulation of the user-interface elements to indicate the storage location (e.g., Tag 1 location, Tag 2 location, etc.) (a) for storage of RFID credential data received during tag-storage mode or (b) for retrieval of data during tag-emulation mode.

The filter circuitry 330 is designed to detect the modulation frequency of an RF signal transmitted by the RFID tag and, in most embodiments, is a standard low-pass filter with component values chosen to fit the modulation type and operating frequencies of the tags and readers with which the key-copying device is meant to operate. Some embodiments may contain circuitry to switch the corner frequency, Fc, of the low pass filter, allowing inter-operation compatibility with a larger tag subset. Commercially available RFID tags typically use one of three different types of modulation: FSK (frequency shift keying), ASK (amplitude shift keying), and PSK (phase shift keying). RFID tag readers are typically designed to read one type of tag using the corresponding type of modulation, but some embodiments of the key-copying device are intended to operate with all three types of modulation so that it functions with all common types of commercially available RFID tags and readers. For a "universal" key-copying device of this nature, the filter circuitry 330 is designed to pass the signal frequencies associated with all three types of modulation.

Most commercial RFID systems use a carrier frequency of approximately 125 kHz. For tags and readers that use FSK and ASK modulation, the RFID credential data is typically modulated onto the carrier signal over a range of frequencies much lower than this. One embodiment uses a 4th-order low-pass Bessel filter with a cutoff frequency of around 38 kHz, which accommodates the range of modulation frequencies used by both FSK and ASK technologies, and therefore such a filter is appropriate for use with FSK-based and ASK-based tags and readers.

For tags and readers using PSK modulation, the modulation typically occurs at (carrier frequency)/2, or 62.5 kHz for a carrier frequency of 125 kHz. Since the PSK modulation frequency is above the passband of the 4th order Bessel filter described above, a switching circuit allows changing the corner frequency by shifting it up to approximately 62 kHz.

The comparator circuitry 340 next receives the signal to detect the waveforms. In some embodiments, at least some features of the comparator circuitry 340, including the comparator reference, are implemented with discrete logic (e.g., in the microcontroller circuitry 350). For FSK, ASK, and PSK modulation, the comparator reference is set to Vdd/2, the value that allows for optimal sensitivity for these waveforms.

Figure 4:
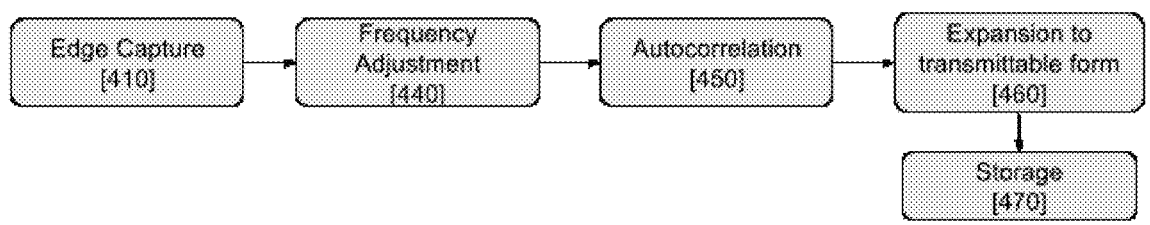
FIG. 4 illustrates the general process of obtaining RFID credential data as performed by an exemplary embodiment of an RFID key-copying device.

FIG. 4 shows the process by which the key-copying device (typically through operation of the microcontroller circuitry) obtains the RFID tag credential data from an incoming carrier signal. This process includes edge capture 410, frequency adjustment 440, autocorrelation 450, expansion to transmittable form 460, and storage 470.

During edge capture 410, the incoming RF signal triggers the comparator 340 of FIG. 3, causing retrieval of the value of a timer which is then stored in memory. The result is an array of discrete data points representing the relative timing between comparator edges. The timing between comparator edges is obtained through use of a timer register within the microcontroller.

During frequency adjustment 440, nominal data values are adjusted to the nearest integer factor of the main carrier frequency. During autocorrelation 450, the endpoint of the RFID tag's credential data is found by autocorrelating across the RFID tag credential data. A buffer that is at least two times the longest supported RFID tag credential data length is used to store the data as it is received. To distinguish self-similar data structures within a tag, the data is checked for multiple copies when the tag length is less than (buffer length)/3. During expansion 460 the symbol data is expanded back to the corresponding timer values necessary to reproduce the RFID tag credential data.

During storage 470, for some embodiments DMA (direct memory access) is used to move data. Although the microcontroller can be used to move data, using DMA frees the microcontroller to complete other tasks and provides for a more efficient implementation. The RFID credential data is written to non-volatile storage (e.g., flash memory) for retrieval in tag-emulation mode 500 (not shown in FIG. 4).

Figure 5:
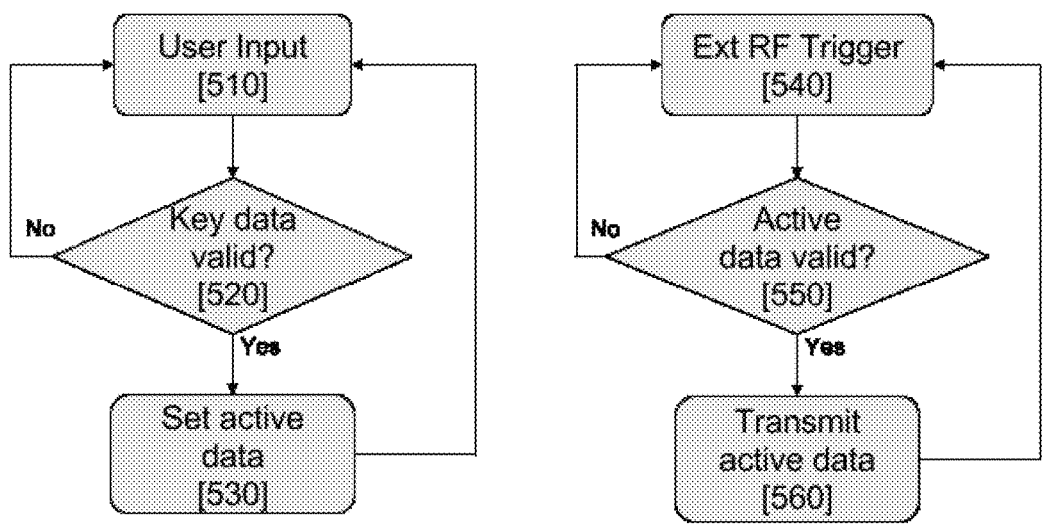
FIG. 5 illustrates the general operation of an exemplary embodiment of an RFID key-copying device in a tag-emulation mode.

FIG. 5 shows the operation of the key-copying device during tag-emulation mode 500. The user makes one of the memory locations "active" by indicating through manipulation of the corresponding user-interface element(s), which RFID tag the user wants to emulate (step 510). This triggers the device (through operation of the microcontroller in some embodiments) to check the device storage (step 520) to see if any valid RFID tag credential data is stored in the memory location corresponding to the user-interface element(s) manipulated by the user. If the memory location contains valid RFID tag credential data, the device activates (step 530) the selected credential data. When an external RF trigger is sensed (from corresponding external reader) (step 540) the device checks to confirm that valid RFID credential data resides in the memory location activated by the user (step 550). The device then emulates the RFID tag from which it copied the data by retrieving the data from storage (e.g., by using a DMA transaction to move the data from memory to the timer register) and transmits the data by manipulating the modulator circuit accordingly (step 560). The time between modulation edges was obtained from the timer register during tag-storage mode, as described above.

For some embodiments, during this step the timer drives the microcontroller (e.g., by toggling a physical pin on the microcontroller circuitry) at the rate specified in the timer register. This pin might, for example, be connected to a MOSFET that detunes the LC tank circuitry of FIG. 3 when active, which results in a drop in voltage across the coil. The RFID reader in this case then detects a small voltage drop due to the magnetic coupling between resonant tank circuits.

Figure 6:
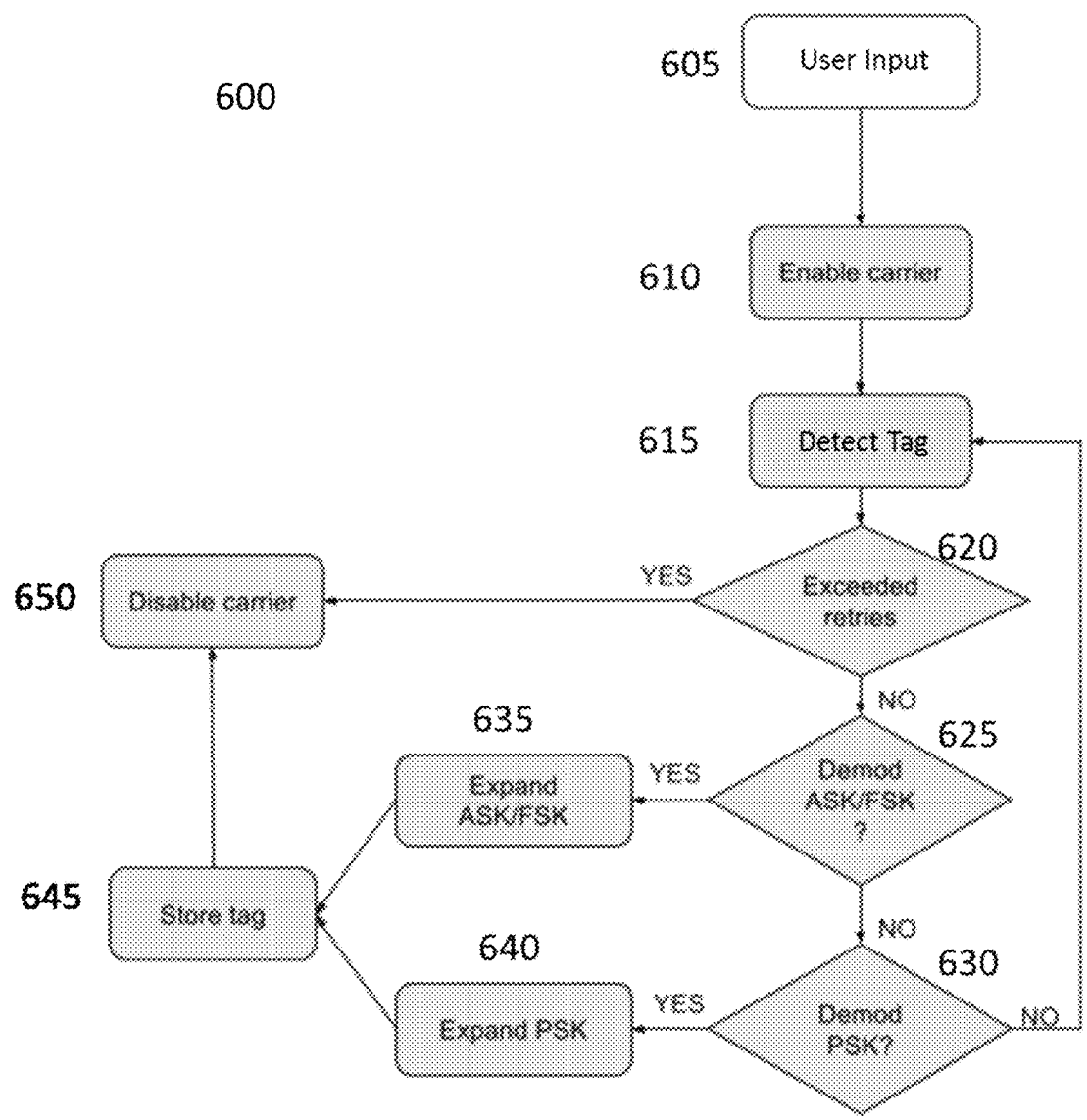
FIG. 6 illustrates the general operation of an exemplary embodiment of an RFID key-copying device in tag-storage mode.

FIG. 6 shows the operation of the key-copying device when in tag-storage mode 600. During a user input step 605, a user places the key-copying device into tag-storage mode 600 by manipulating a corresponding user-interface mechanism, such as a button, on the device. For a device that itself provides the interrogation signal to the RFID tag being copied, a carrier signal is generated (step 610) through the LC tank circuitry 310 of FIG. 3 to power the tag. The LC tank circuitry receives the tag's response to that signal (step 615). For a device that passively "sniffs" the interaction between the tag and an external reader, no interrogation signal is generated within the device, and the LC tank circuitry simply receives & detects the tag's response to the external reader (step 615). If the key-copying device does not detect ASK or FSK modulation but instead detects PSK modulation (step 630), the device demodulates and expands the PSK signal to obtain the RFID credential data from the PSK signal (step 640), as described above.

Once activated by the user, the key-copying device attempts for a limited number of attempts and/or amount of time to detect an incoming signal from an RFID tag and, if it is unsuccessful in detecting a signal after so many tries (step 620), disables the LC tank circuitry and the outgoing carrier signal (step 650).

On detecting an incoming RFID signal, the device deciphers whether the signal uses either ASK, FSK, or PSK modulation (step 625) and, if so, demodulates and expands the ASK or FSK signal to obtain the RFID credential data from the signal (step 635), as described above. Once the device has obtained the RFID credential data from the signal received from the RFID tag, the device stores the tag's credential data to the storage device, as described above, and then disables the carrier signal (step 650) until the user once again takes action to place the device in either tag-storage or tag-emulation mode.

While the invention has been described here in terms one or more preferred embodiments, it will be apparent to those skilled in the art that various changes and modifications can be made to those embodiments, and other embodiments altogether can be used to carry out the invention, without departing from the scope and spirit of the invention.

What is claimed is:

1. An electronic device for use in acquiring and storing radio frequency identification (RFID) credential data embedded in an RFID tag that is configured to communicate through one of multiple communication protocols, where the electronic device is unaware of which communication protocol the RFID tag is configured to use, the electronic device comprising:

a mechanical housing designed to fit within and allow manipulation by a human hand;

electronic circuitry mounted within the mechanical housing and configured to:

receive an RF signal emitted by the RFID tag in response to an RF interrogation signal, where the RF signal carries the RFID credential data;

process the RF signal to identify which of the communication protocols the RFID tag is configured to use;

acquire the RFID credential data from the RF signal;

store the RFID credential data; and emulate the RFID tag by transmitting the stored RFID credential data to an RFID tag reader by way of the communication protocol which the RFID tag is configured to use;

a power source coupled to the electronic circuitry to provide electrical power to the electronic circuitry; and an interface mechanism coupled to the electronic circuitry to allow a human user to effect operation of the electronic circuitry;

where, in order to effect emulation of the RFID tag, the electronic circuitry is configured to detect the human user's manipulation of the interface mechanism in a manner to activate a tag-emulation mode.

2. The electronic device of claim 1, where, in order to effect processing of the RF signal, the electronic circuitry is configured to detect the human user's manipulation of the interface mechanism in a manner to activate a tag-reading mode of operation.

3. The electronic device of claim 1, where, in receiving the RF signal, the electronic circuitry is configured to intercept the RF signal as the RFID tag responds to an RFID tag reader that emits the RF interrogation signal.

4. The electronic device of claim 1, where the electronic circuitry is configured to create and emit the RF interrogation signal to which the RFID tag responds.

5. The electronic device of claim 1, where the electronic circuitry is configured to store the RFID credential data in a storage location selected by the human user through manipulation of the interface mechanism.

6. The electronic device of claim 1, where the electronic circuitry is configured for identification of at least two communication protocols, each corresponding to a modulation type in a group consisting of amplitude-shift keying (ASK), frequency-shift keying (FSK), and phase-shift keying (PSK).

7. The electronic device of claim 6, where the electronic circuitry is configured for identification of at least three communication protocols, each corresponding to one of the modulation types in the group.

8. The electronic device of claim 1, where the RF signal has a main carrier frequency and, in processing the RF signal, the electronic circuitry is configured to adjust frequency of the RF signal to a nearest integer factor of the main carrier frequency.

9. The electronic device of claim 1, where, in acquiring the RF ID credential data, the electronic circuitry is configured to distinguish self-similar data structures.

10. An electronic device for use in acquiring and storing radio frequency identification (RFID) credential data embedded in multiple RFID tags, each configured to communicate through one of multiple communication protocols, where the electronic device is unaware of which communication protocol each of the RFID tags is configured to use, the electronic device comprising:
   a mechanical housing designed to fit within and allow manipulation by a human hand;
   electronic circuitry mounted within the mechanical housing and configured to:
      receive from the RFID tags RF signals emitted by the RFID tags in response to RF interrogation signals, where the RF signals carry the RFID credential data that is embedded in the RFID tags;
      process each of the RF signals to identify which of the communication protocols each of the RFID tags is configured to use;
      acquire the RFID credential data from each of the RF signals;
      store the RFID credential data; and
      emulate the RFID tags by transmitting the stored RFID credential data to one or more RFID tag readers by way of the communication protocols which the RFID tags are configured to use;
   a power source coupled to the electronic circuitry to provide electrical power to the electronic circuitry; and
   an interface mechanism coupled to the electronic circuitry to allow a human user to effect operation of the electronic circuitry;
   where, in order to effect emulation of each of the RFID tags, the electronic circuitry is configured to detect the human user's manipulation of the interface mechanism in a manner to activate a tag-emulation mode.

11. The electronic device of claim 10, where, in storing the RFID credential data, the electronic circuitry is configured to place the RFID credential data from each of the tags in a corresponding storage location selected by the human user through manipulation of the interface mechanism.

12. The electronic device of claim 10, where, in order to effect processing of the RF signals, the electronic circuitry is configured, for each of the RF signals, to detect the human user's manipulation of the interface mechanism in a manner to activate a tag-reading mode of operation.

13. The electronic device of claim 10, where, in emulating the RFID tags, the electronic circuitry is configured to retrieve the RFID credential data for each of the RFID tags from a corresponding storage location selected by the human user through manipulation of the interface mechanism.

14. The electronic device of claim 10, where the RF interrogation signals to which the RFID tags respond are emitted by one or more RFID tag readers, and where, in receiving the RF signals, the electronic circuitry is configured to intercept the RF signals as the RFID tags respond to the RF interrogation signals.

15. The electronic device of claim 10, where the electronic circuitry is configured to create and emit the RF interrogation signals to which the RFID tags respond.

16. The electronic device of claim 10, where the electronic circuitry is configured for identification of at least two communication protocols, each corresponding to a modulation type in a group consisting of amplitude-shift keying (ASK), frequency-shift keying (FSK), and phase-shift keying (PSK).

17. The electronic device of claim 16, where the electronic circuitry is configured for identification of at least three communication protocols, each corresponding to one of the modulation types in the group.

18. A method for use within an electronic device in acquiring and storing radio frequency identification (RFID) credential data embedded in an RFID tag that is configured to communicate through one of multiple communication protocols, where the electronic device is unaware of which communication protocol the RFID tag is configured to use, the method comprising:
   receiving an RF signal emitted by the RFID tag in response to an RF interrogation signal, where the RF signal carries the RFID credential data;
   processing the RF signal to identify which of the communication protocols the RFID tag is configured to use;
   acquiring the RFID credential data from the RF signal;
   storing the RFID credential data; and
   in response to input from a human user, emulating the RFID tag by transmitting the stored RFID credential data to an RFID tag reader by way of the communication protocol which the RFID tag is configured to use.

19. A method for use within an electronic device in acquiring and storing radio frequency identification (RFID) credential data embedded in multiple RFID tags, each configured to communicate through one of multiple communication protocols, where the electronic device is unaware of which communication protocol each of the RFID tags is configured to use, the method comprising:
   receiving from the RFID tags RF signals emitted by the RFID tags in response to RF interrogation signals, where the RF signals carry the RFID credential data that is embedded in the RFID tags;
   processing each of the RF signals to identify which of the communication protocols each of the RFID tags is configured to use;
   acquiring the RFID credential data from each of the RF signals;
   storing the RFID credential data; and
   in response to input from a human user, emulating the RFID tags by transmitting the stored RFID credential data to one or more RFID tag readers by way of the communication protocols which the RFID tags are configured to use.

* * * * *